(12) United States Patent
Wang et al.

(10) Patent No.: US 11,511,292 B1
(45) Date of Patent: Nov. 29, 2022

(54) VARIABLE-FLOW-RATE ANTI-CLOGGING EMITTER AND IRRIGATION METHOD THEREOF

(71) Applicant: INSTITUTE OF ENVIRONMENT AND SUSTAINABLE DEVELOPMENT IN AGRICULTURE, CAAS, Beijing (CN)

(72) Inventors: Jiandong Wang, Beijing (CN); Xurong Mei, Beijing (CN); Xuefeng Qiu, Beijing (CN); Haitao Wang, Beijing (CN); Chuanjuan Wang, Beijing (CN); Weiping Hao, Beijing (CN); Daozhi Gong, Beijing (CN); Haoru Li, Beijing (CN)

( * ) Notice: Subject to any disclaimer, the term of this patent is extended or adjusted under 35 U.S.C. 154(b) by 0 days.

(21) Appl. No.: 17/829,387

(22) Filed: Jun. 1, 2022

(30) Foreign Application Priority Data

Oct. 14, 2021 (CN) .......................... 202111196118.2

(51) Int. Cl.
    *B05B 1/34*     (2006.01)
    *B05B 15/52*     (2018.01)
    (Continued)

(52) U.S. Cl.
    CPC .............. *B05B 1/34* (2013.01); *A01G 25/023* (2013.01); *B05B 15/52* (2018.02); *B05B 15/55* (2018.02);
    (Continued)

(58) Field of Classification Search
    CPC ........... B05B 1/34; B05B 15/52; B05B 15/55; A01G 25/02; A01G 25/023; B08B 9/0321; B08B 2209/032
    (Continued)

(56) References Cited

U.S. PATENT DOCUMENTS 6,015,102 A * 1/2000 Daigle ................. A01G 25/023
    239/542
6,206,305 B1 * 3/2001 Mehoudar ............ A01G 25/023
    239/533.1
(Continued)

FOREIGN PATENT DOCUMENTS

CN      2554921 Y      6/2003
CN      101722118 A      6/2010
(Continued)

*Primary Examiner* — Steven J Ganey

(57) ABSTRACT

A variable-flow-rate anti-clogging emitter includes an upper casing and a lower casing, where the upper casing and the lower casing are fixedly connected with each other; the upper casing has a flat top surface provided with a water outlet and a bottom surface provided with a truncated conical slot in communication with the water outlet; the lower casing includes a flow channel portion and a discharging portion, which are recessed in an upper surface of the lower casing; the flow channel portion has one end provided with multiple parallel feeding channels and an other end communicated with the discharging portion; one end of a lower surface of the lower casing is provided with an L-shaped platform; water inlets of the multiple feeding channels are arranged on a side wall of the L-shaped platform; and an elastomer flow channel is fixedly provided between the upper casing and the lower casing.

10 Claims, 6 Drawing Sheets

(51) Int. Cl.
*A01G 25/02* (2006.01)
*B08B 9/032* (2006.01)
*B05B 15/55* (2018.01)

(52) U.S. Cl.
CPC ...... *B08B 9/0321* (2013.01); *B08B 2209/032* (2013.01)

(58) Field of Classification Search
USPC .................................. 239/1, 542, 547, 533.1
See application file for complete search history.

(56) References Cited

U.S. PATENT DOCUMENTS

| | | | |
|---|---|---|---|
| 6,213,408 B1 | 4/2001 | Shekalim | |
| 8,141,589 B2* | 3/2012 | Socolsky | A01G 25/023 138/42 |
| 2005/0284966 A1* | 12/2005 | DeFrank | A01G 25/023 239/542 |
| 2006/0237561 A1* | 10/2006 | Park | A01G 25/023 239/542 |
| 2007/0194149 A1* | 8/2007 | Mavrakis | A01G 25/023 239/542 |
| 2009/0173811 A1* | 7/2009 | Gorney | A01G 25/023 239/542 |
| 2011/0186652 A1* | 8/2011 | Cohen | A01G 25/023 239/542 |
| 2013/0248616 A1* | 9/2013 | Ensworth | A01G 25/023 239/542 |
| 2016/0219803 A1* | 8/2016 | Keren | A01G 25/023 |

FOREIGN PATENT DOCUMENTS

| | | |
|---|---|---|
| CN | 102860246 A | 1/2013 |
| CN | 102870650 A | 1/2013 |
| CN | 202860733 U | 4/2013 |
| CN | 204598870 U | 9/2015 |
| CN | 205455054 U | 8/2016 |
| CN | 207340886 U | 5/2018 |
| CN | 109937851 A | 6/2019 |
| CN | 112205282 A | 1/2021 |
| DE | 2535732 A1 | 2/1976 |
| EP | 3369309 A1 | 9/2018 |
| JP | 2016073235 A | 5/2016 |
| SU | 1501981 A1 | 8/1989 |

* cited by examiner

VARIABLE-FLOW-RATE ANTI-CLOGGING EMITTER AND IRRIGATION METHOD THEREOF

CROSS REFERENCE TO THE RELATED APPLICATIONS

This application is based upon and claims priority to Chinese Patent Application No. 202111196118.2, filed on Oct. 14, 2021, the entire contents of which are incorporated herein by reference.

TECHNICAL FIELD

The present disclosure relates to the technical field of drip irrigation, and in particular to a variable-flow-rate anti-clogging emitter and an irrigation method thereof.

BACKGROUND

Drip irrigation is an advanced irrigation method that can achieve efficient water saving and the significant effect of improving quality and performance. With the increasingly prominent water shortage in China, drip irrigation technology, especially poor-quality water (Yellow River water, reclaimed water and even wastewater, etc.) drip irrigation technology, has developed rapidly in China. This has greatly improved the utilization of poor-quality water resources and made a significant contribution to the sustainable development of China's water resources. In poor-quality water drip irrigation, impurities such as gravel, sludge and microorganisms in the complex composition of water are easily deposited, agglomerated and attached to the narrow flow channel of the emitter, thereby causing the emitter to be clogged. The widespread clogging problem of the emitter, the core of the drip irrigation system, seriously restricts the in-depth development of drip irrigation technology. In the field of underground drip irrigation where the emitter is deeply buried and outflows by slowly dripping, it is hard to rely on soil capillary action to guide the water flow to the vicinity of the root zone of the crop during the seedling stage, which hinders seedling emergence. In addition, in saline-alkali regions, although the existing salt-control drip irrigation method provides a good environment for crop development, it still has problems such as small water output, small leaching area, and poor salt control effect. Overall, the emitter in the existing poor-quality water drip irrigation technology suffers from the problems such as high clogging rate, difficult underground irrigation during the seedling stage, and poor salt leaching effect. To solve these problems, it is necessary to develop an anti-clogging emitter with a large flow rate and adjustable outflow.

In the prior art, a variable-flow-rate emitter (Patent No. 202011259298.X) alleviates clogging by activating a second flow channel and achieves the purpose of increasing the height of the wetting front. However, the internal structure of the emitter is complex. As a result, the clogging substances cannot be directly flushed, and it must be indirectly flushed with the help of water flow in the other channel, resulting in a poor flushing effect. In addition, the emitter can hardly match with the existing emitter production line, making it hard for mass production, popularization and application, and resulting in a high production cost.

SUMMARY

In order to overcome the above-mentioned shortcomings of the prior art, the present disclosure provides a variable-flow-rate anti-clogging emitter and an irrigation method thereof, which can control the change of the structural shape of a flow channel.

In order to achieve the above objective, the present disclosure adopts the following technical solutions:

A variable-flow-rate anti-clogging emitter includes an upper casing and a lower casing, where the upper casing and the lower casing are fixedly connected with each other; the upper casing has a flat top surface provided with a water outlet and a bottom surface provided with a truncated conical slot in communication with the water outlet; the lower casing includes a flow channel portion and a discharging portion, which are recessed in an upper surface of the lower casing; the flow channel portion has one end provided with multiple parallel feeding channels and an other end communicated with the discharging portion; one end of a lower surface of the lower casing is provided with an L-shaped platform; water inlets of the multiple feeding channels are arranged on a side wall of the L-shaped platform; an elastomer flow channel is fixedly provided between the upper casing and the lower casing; the elastomer flow channel is provided with multiple limit holes, and the flow channel portion is provided with multiple limit posts; and the multiple limit posts are inserted and fitted into the multiple limit holes.

Further, the elastomer flow channel may be provided in a central portion of the flow channel portion; and the two side surfaces of the elastomer flow channel in a length direction may be spaced apart from the two side surfaces of the flow channel portion.

Further, the elastomer flow channel may be provided with flat top and bottom surfaces; the two side surfaces of the elastomer flow channel in the length direction and the two side surfaces of the flow channel portion may be respectively provided with serrated surfaces extending in the length direction; and the serrated surfaces each may be provided with multiple serrations.

Further, two ends of the elastomer flow channel may be respectively provided with arc surfaces.

Further, the serrations have a height H of 1.20-1.80 mm, a spacing B of 2.3-3.3 mm, an angle θ of 30-45° and a tip deviation Δ of 0 mm; and the elastomer flow channel may have a depth D of 0.65-0.95 mm and a total length L of 13.5-16.5 mm.

Further, the water outlet may have a radius R of 2-3 mm; and the water inlet may have a length a of 1-2 mm and a width b of 0.5-1 mm.

Further, the multiple feeding channels may be each provided therein with a first inclined surface, and the lower surface of the lower casing may be provided with a second inclined surface having a same inclination direction as the first inclined surface.

Further, the discharging portion may be provided with a circular slot, which may be connected with the slot.

The present disclosure provides an irrigation method of the variable-flow-rate anti-clogging emitter, including the following steps:

S1: providing the emitter along a direction of a water flow, and setting a plane of the water inlets as a downstream plane, such that the water flow first passes through the second inclined surface, and then reaches the water inlets;

S2: adjusting a water pressure of the emitter to 0.12-0.15 MPa for jet irrigation;

S3: allowing, when the water pressure increases to 0.12-0.15 MPa, the water flow on two sides of the flow channel portion to squeeze the elastomer flow channel, such that the elastomer flow channel is structurally changed, and double flow channels formed between the two sides of the elastomer flow channel and the flow channel portion are widened to increase a flow area, thereby greatly increasing a flow rate of the emitter;

S4: allowing, when the water flow enters the circular slot of the discharging portion of the emitter, the circular slot to cooperate with the truncated conical slot and the water outlet above to realize jet outflow of the water outlet of the emitter; and S5: allowing, when the flow channel portion of the emitter is seriously attached and clogged by sludge, the double flow channels formed between the elastomer flow channel and the flow channel portion to be seriously occupied and an upstream water pressure inside the emitter to increase relatively; and flushing impurities such as sludge out of the emitter under the action of the increasing water pressure to realize automatic flushing inside the flow channels, thereby alleviating the clogging of the emitter.

The present disclosure has the following beneficial effects:

1. The variable-flow-rate anti-clogging emitter proposed by the present disclosure has a simple structure and an obvious anti-clogging effect. The present disclosure adjusts the structure of the elastomer flow channel through the change of the water pressure, thereby adjusting the width of the flow channel to realize the change of the flow rate and the outflow state of the emitter. In addition, the present disclosure has the function of automatic sludge removal.

2. In the present disclosure, the elastomer flow channel divides the flow channel portion into double flow channels, and the elastomer flow channel is provided between the double flow channels, which enhances the hydraulic energy dissipation effect of the elastomer flow channel.

3. In the present disclosure, the elastomer flow channel is provided with flat top and bottom surfaces, which make the elastomer flow channel in close contact with the upper casing and the lower casing, facilitating the limiting and fixing of the elastomer flow channel. Besides, the two side surfaces of the elastomer flow channel and two side surfaces of the flow channel portion are respectively provided with serrated surfaces extending in a length direction. The serrated surfaces each are provided with multiple serrations, which offer an effect of hydraulic energy dissipation for the elastomer flow channel. Thus, the water flow maintains a turbulent state in the flow channels to achieve the effect of turbulent energy dissipation.

4. In the present disclosure, the two ends of the elastomer flow channel are respectively provided with arc surfaces. The arc surface at a side of the feeding channel has a function of shearing the water flow and reducing the hydraulic loss, and the arc surface at a side of the discharging portion has a function of converging the water flow.

5. In the present disclosure, the multiple feeding channels are each provided therein with a first inclined surface, which reduce the hydraulic loss when the water flows from the water inlets into the flow channel portion. In addition, the second inclined surface is used as a flushing surface. The water flow first passes through the flushing surface and then enters the water inlets, which greatly alleviates the problem that sludge is caused by a horizontal impact force to directly attach to the water inlets.

6. In the present disclosure, when the water pressure increases to 0.12-0.15 MPa, the water flow passes through the serrated flow channel of the emitter. After energy dissipates in the serrated flow channel, the water flow enters the circular slot of the discharging portion of the emitter. The circular slot cooperates with the truncated conical slot and the water outlet above to converge and pressurize the water flow, such that the water outlet of the emitter realizes jet outflow.

7. The emitter of the present disclosure is easy to use and has an obvious anti-clogging effect. The emitter of the present disclosure can realize flexible switching between two working modes of slow drip irrigation and jet irrigation according to different water pressures. In addition, the emitter of the present disclosure has the function of automatic sludge removal, which greatly enhances the practicability of the emitter.

Figure 1:
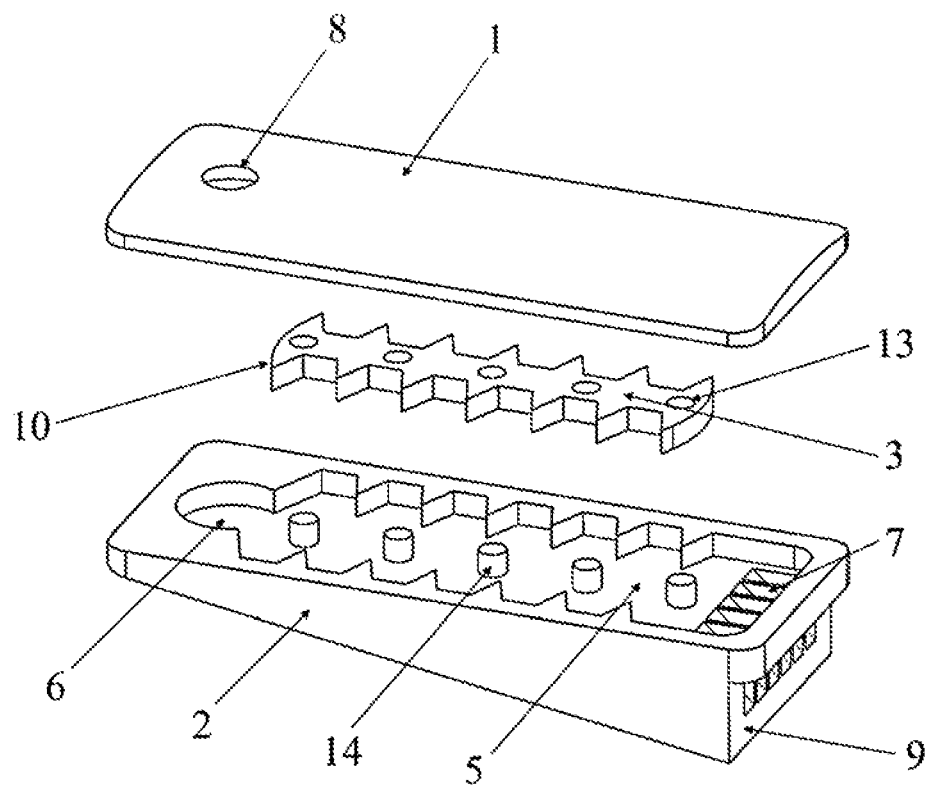
FIG. 1 is an exploded view of a variable-flow-rate anti-clogging emitter according to the present disclosure.

Reference Numerals: 1. upper casing; 2. lower casing; 3. elastomer flow channel; 4. slot; 5. flow channel portion; 6. discharging portion; 7. feeding channel; 8. water outlet; 9. L-shaped platform; 10. arc surface; 11. first inclined surface; 12. water inlet; 13. limit hole; 14. limit post; and 15. second inclined surface.

DETAILED DESCRIPTION OF THE EMBODIMENTS

The specific implementations of the present disclosure are described below to facilitate those skilled in the art to understand the present disclosure, but it should be clear that the present disclosure is not limited to the scope of the specific implementations. Various obvious changes made by those of ordinary skill in the art within the spirit and scope of the present disclosure defined by the appended claims should fall within the protection scope of the present disclosure.

Figure 2:
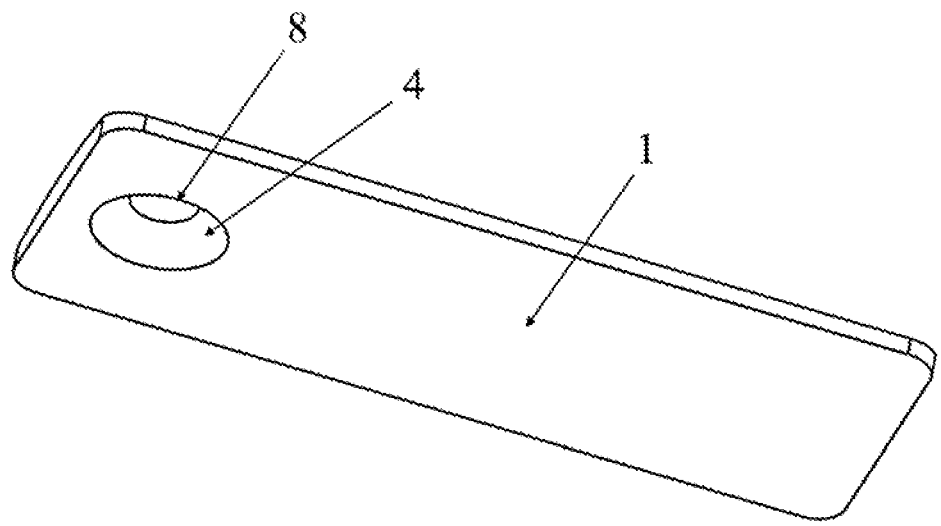
FIG. 2 is a three-dimensional view of a bottom of an upper casing of the variable-flow-rate anti-clogging emitter according to the present disclosure.

As shown in FIGS. 1 and 2, the present disclosure provides a variable-flow-rate anti-clogging emitter. The emitter includes an upper casing 1 and a lower casing 2. The upper casing 1 and the lower casing 2 are in a rectangular plate-like structure, and the upper casing 1 and the lower casing 2 are fixedly connected with each other. The upper casing 1 has a flat top surface provided with a water outlet 8 and a bottom surface provided with a truncated conical slot 4 in communication with the water outlet 8.

Figure 3:
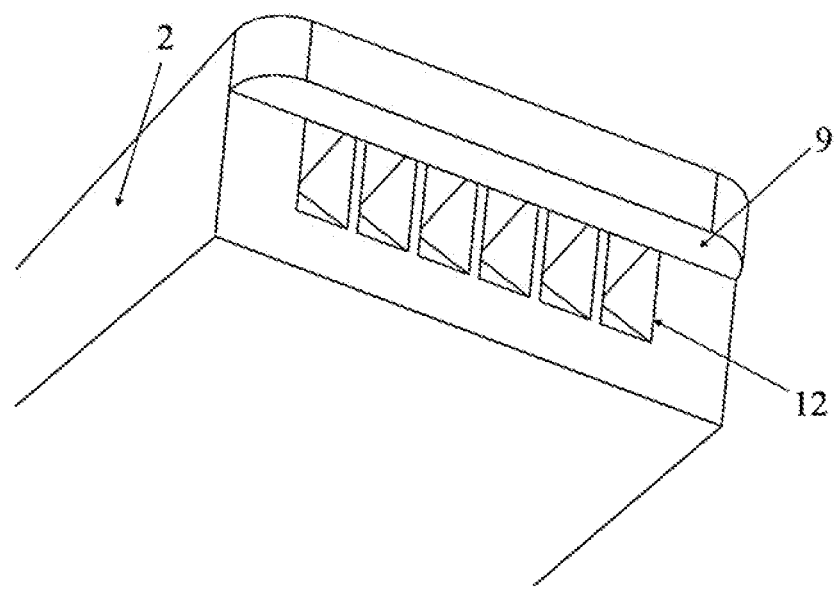
FIG. 3 is a partial top view of an end of a lower casing of the variable-flow-rate anti-clogging emitter according to the present disclosure.
Figure 4:
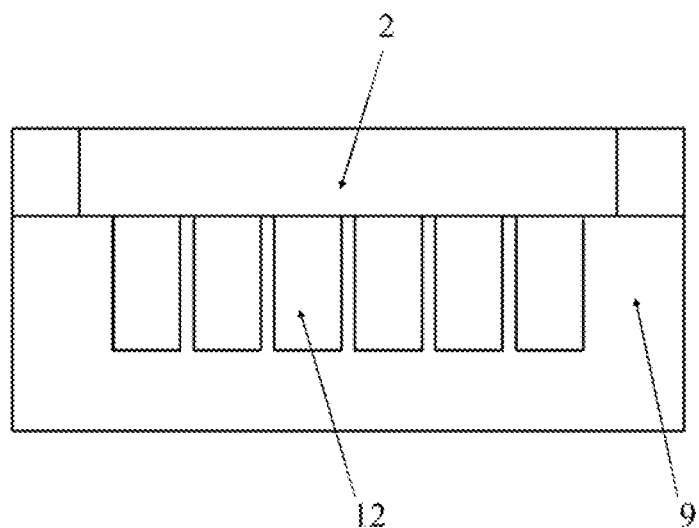
FIG. 4 is a front view of the end of the lower casing of the variable-flow-rate anti-clogging emitter according to the present disclosure.

As shown in FIGS. 1, 3 and 4, the lower casing 2 includes a flow channel portion 5 and a discharging portion 6. The flow channel portion 5 and the discharging portion 6 are recessed in an upper surface of the lower casing 2. The discharging portion 6 is provided with a circular slot, which is connected with the slot 4. After a water flow enters the circular slot, the circular slot cooperates with the truncated conical slot 4 and the water outlet 8 above to converge and pressurize the water flow to realize jet outflow. The flow channel portion 5 has one end provided with multiple parallel feeding channels 7 and an other end communicated with the discharging portion 6. One end of a lower surface of the lower casing 2 is provided with an L-shaped platform 9, and water inlets 12 of the multiple feeding channels 7 are arranged on a side wall of the L-shaped platform 9. This design greatly alleviates the problem that sludge is caused by a horizontal impact force to directly attach to the water inlets 12. Meanwhile, when the emitter is flushed, a negative pressure is formed at the water inlets 12, which helps to remove the attachments at the water inlets 12.

Figure 5:
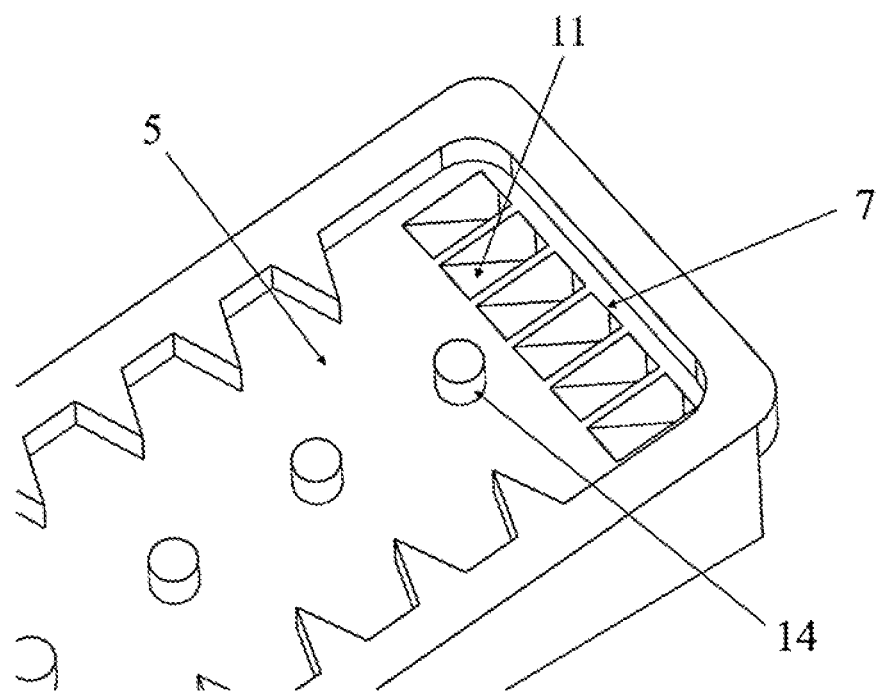
FIG. 5 is a partial top view of the end of the lower casing of the variable-flow-rate anti-clogging emitter according to the present disclosure.
Figure 6:
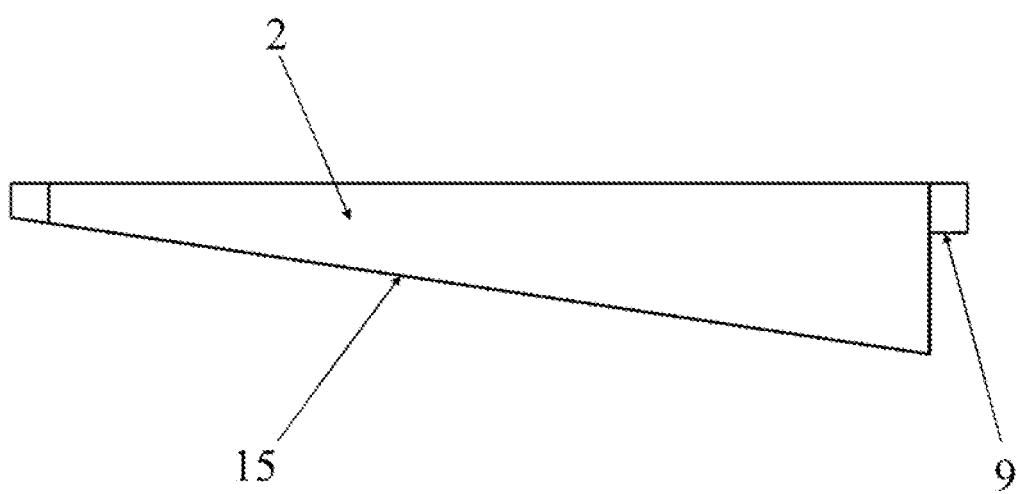
FIG. 6 is a lateral view of the lower casing of the variable-flow-rate anti-clogging emitter according to the present disclosure.

As shown in FIGS. 5 and 6, the multiple feeding channels 7 are each provided therein with a first inclined surface 11. The first inclined surfaces 11 reduce the hydraulic loss when the water flows from the water inlets 12 into the flow channel portion 5. The lower surface of the lower casing 2 is provided with a second inclined surface 15 having a same inclination direction as the first inclined surfaces 11. The second inclined surface 15 is used as a flushing surface. The water flow first passes through the flushing surface and then enters the water inlets, which greatly alleviates the problem that sludge is caused by a horizontal impact force to directly attach to the water inlets.

Figure 7:
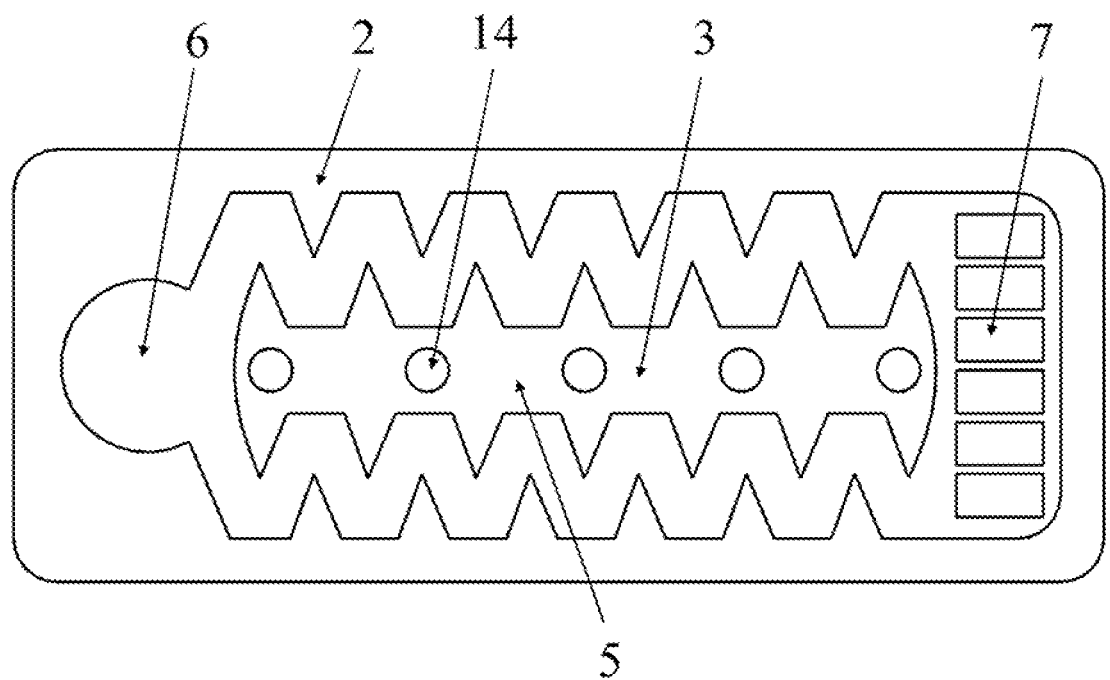
FIG. 7 is a top view of the lower casing and an elastomer flow channel of the variable-flow-rate anti-clogging emitter according to the present disclosure.

As shown in FIGS. 1 and 7, an elastomer flow channel 3 is fixedly provided between the upper casing 1 and the lower casing 2. The elastomer flow channel 3 is provided with multiple limit holes 13, and the flow channel portion 5 is provided with multiple limit posts 14 corresponding to the limit holes. The limit posts 14 are inserted and fitted into the limit holes 13, such that the elastomer flow channel 3 is fixedly provided in the flow channel portion 5. The elastomer flow channel 3 is provided with flat top and bottom surfaces, which make the elastomer flow channel in close contact with the upper casing 1 and the lower casing 2, facilitating the limiting and fixing of the elastomer flow channel 3. Two side surfaces of the elastomer flow channel 3 in a length direction and two side surfaces of the flow channel portion 5 are respectively provided with serrated surfaces extending in the length direction. The serrated surfaces each are provided with multiple serrations, which offer an effect of hydraulic energy dissipation for the elastomer flow channel 3. Thus, the water flow maintains a turbulent state in the flow channel portion 5, which is convenient for surface drip irrigation. Two ends of the elastomer flow channel are respectively provided with arc surfaces 10. The arc surface 10 at a side of the feeding channel 7 has a function of shearing the water flow and reducing the hydraulic loss, and the arc surface 10 at a side of the discharging portion 6 has a function of converging the water flow.

The elastomer flow channel 3 is provided in a central portion of the flow channel portion 5. The two side surfaces of the elastomer flow channel 3 are respectively spaced apart from the two side surfaces of the flow channel portion 5. The elastomer flow channel 3 divides the flow channel portion 5 into double flow channels, and the elastomer flow channel 3 is provided between the double flow channels, which enhances the hydraulic energy dissipation effect of the elastomer flow channel 3.

Under the action of a water pressure, the two side surfaces of the elastomer flow channel 3 can be changed from a serrated shape to a straight shape, such that the hydraulic energy dissipation effect of the elastomer flow channel 3 is weakened. In this way, the elastomer flow channel cooperates with the truncated conical slot 4 and the water outlet 8 to converge and pressurize the water flow to realize jet flow.

Figure 8:
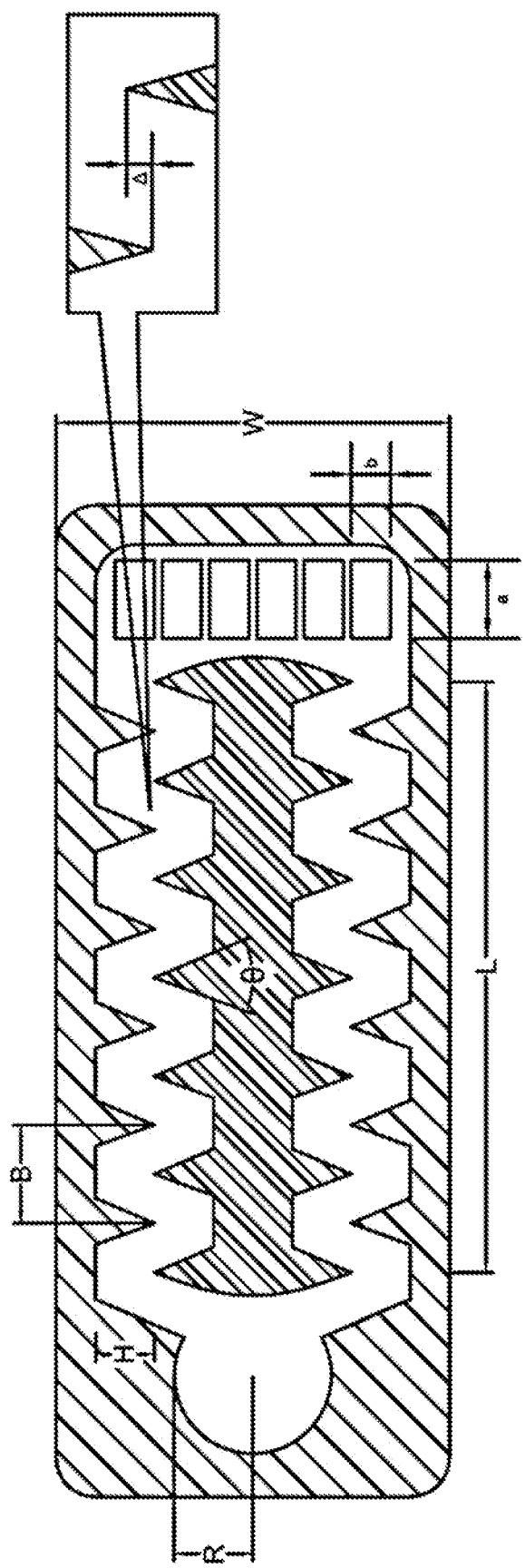
FIG. 8 shows structural parameters of the flow channel portion and the elastomer flow channel according to the present disclosure.
Figure 9:
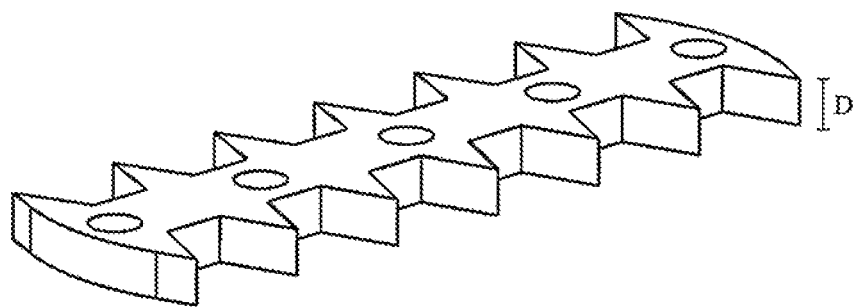
FIG. 9 shows a depth parameter of the elastomer flow channel according to the present disclosure.

As shown in FIGS. 8 and 9, the present disclosure provides flow channel parameters of the variable-flow-rate anti-clogging emitter. These parameters include: serration height H: 1.20-1.80 mm, serration spacing B: 2.3-3.3 mm, serration angle θ: 30-45°, and serration tip deviation Δ: 0 mm; depth D of the elastomer flow channel 3: 0.65-0.95 mm, and total length L of the elastomer flow channel 3: 13.5-16.5 mm; radius R of the water outlet 8: 2-3 mm; and length a of the water inlet 12: 1-2 mm, and width b of the water inlet 12: 0.5-1 mm.

The present disclosure provides an irrigation method of the variable-flow-rate anti-clogging emitter, including the following steps:

S1: Provide the emitter along a direction of a water flow, and set a plane of the water inlets 12 as a downstream plane, such that the water flow first passes through the second inclined surface 15, and then reaches the water inlets 12.

S2: Adjust a water pressure of the emitter to 0.12-0.15 MPa for jet irrigation.

S3: Allow, when the water pressure increases to 0.12-0.15 MPa, the water flow on the two sides of the flow channel portion 5 to squeeze the elastomer flow channel 3, such that the elastomer flow channel 3 is structurally changed, and the double flow channels formed between the two sides of the elastomer flow channel 3 and the flow channel portion 5 are widened to increase a flow area, thereby greatly increasing a flow rate of the emitter.

S4: Allow, when the water flow enters the circular slot of the discharging portion 6 of the emitter, the circular slot to cooperate with the truncated conical slot 4 and the water outlet 8 above to realize jet outflow of the water outlet 8 of the emitter.

S5: Allow, when the flow channel portion of the emitter is seriously attached and clogged by sludge, the double flow channels formed between the elastomer flow channel 3 and the flow channel portion 5 to be seriously occupied and an upstream water pressure inside the emitter to increase relatively; and flush impurities such as sludge out of the emitter under the action of the increasing water pressure to realize automatic flushing inside the flow channels, thereby alleviating the clogging of the emitter.

The emitter of the present disclosure has a simple structure, is easy to use, and has an obvious anti-clogging effect. The present disclosure automatically adjusts the structural change of the elastomer flow channel 3 in the flow channel portion through the change of the water pressure, thereby adjusting the flow rate and the outflow state of the emitter and improving the anti-clogging performance. In addition, the present disclosure can automatically flush the clogging substances inside the emitter.

What is claimed is:
1. A variable-flow-rate anti-clogging emitter, comprising an upper casing and a lower casing, wherein the upper casing and the lower casing are fixedly connected with each other; and the upper casing has a flat top surface provided with a water outlet and the bottom surface provided with a truncated conical slot in a communication with the water outlet;
   the lower casing comprises a flow channel portion and a discharging portion, which are recessed in an upper surface of the lower casing; the flow channel portion has one end provided with multiple parallel feeding channels and an other end communicated with the discharging portion; one end of a lower surface of the lower casing is provided with an L-shaped platform; and water inlets of the multiple parallel feeding channels are arranged on a side wall of the L-shaped platform;
   an elastomer flow channel is fixedly provided between the upper casing and the lower casing; the elastomer flow channel is provided with multiple limit holes, and the flow channel portion is provided with multiple limit posts; and the multiple limit posts are inserted and fitted into the multiple limit holes;
   the elastomer flow channel is provided in a central portion of the flow channel portion; and two side surfaces of the elastomer flow channel in a length direction are respectively spaced apart from two side surfaces of the flow channel portion;
   the elastomer flow channel is provided with a flat top surface and a bottom surface; the two side surfaces of the elastomer flow channel in the length direction and the two side surfaces of the flow channel portion are respectively provided with serrated surfaces extending in the length direction; and the serrated surfaces each are provided with multiple serrations; and
   two ends of the elastomer flow channel are respectively provided with arc surfaces.

2. The variable-flow-rate anti-clogging emitter according to claim 1, wherein the serrations have a height of 1.20-1.80 mm, a spacing of 2.3-3.3 mm, an angle of 30-45° and a tip deviation of 0 mm; and the elastomer flow channel has a depth of 0.65-0.95 mm and a total length of 13.5-16.5 mm.

3. The variable-flow-rate anti-clogging emitter according to claim 1, wherein the water outlet has a radius of 2-3 mm; and the water inlet has a length of 1-2 mm and a width of 0.5-1 mm.

4. The variable-flow-rate anti-clogging emitter according to claim 1, wherein the multiple parallel feeding channels are each provided therein with a first inclined surface, and the lower surface of the lower casing is provided with a second inclined surface having a same inclination direction as the first inclined surface.

5. The variable-flow-rate anti-clogging emitter according to claim 1, wherein the discharging portion is provided with a circular slot, which is connected with the slot.

6. An irrigation method of the variable-flow-rate anti-clogging emitter according to claim 1, comprising the following steps:

S1: providing the emitter along a direction of a water flow, and setting a plane of the water inlets as a downstream plane, such that the water flow first passes through a second inclined surface, and then reaches the water inlets;
   S2: adjusting a water pressure of the emitter to 0.12-0.15 MPa for a jet irrigation;
   S3: allowing, when the water pressure increases to 0.12-0.15 MPa, the water flow on the two sides of the flow channel portion to squeeze the elastomer flow channel, such that a serrated structure of the elastomer flow channel is deformed, and double flow channels formed between the two sides of the elastomer flow channel and the flow channel portion are widened to increase a flow area, thereby greatly increasing a flow rate of the emitter;
   S4: allowing, when the water flow enters a circular slot of the discharging portion of the emitter, the circular slot to cooperate with the truncated conical slot and the water outlet above to realize a jet outflow of the water outlet of the emitter; and
   S5: allowing, when the flow channel portion of the emitter is seriously attached and clogged by a sludge, the double flow channels formed between the elastomer flow channel and the flow channel portion to be seriously occupied and an upstream water pressure inside the emitter to increase relatively; and flushing the sludge out of the emitter under an action of the increasing water pressure to realize an automatic flushing inside the double flow channels, thereby alleviating the clogging of the emitter.

7. The irrigation method according to claim 6, wherein in the variable-flow-rate anti-clogging emitter, the serrations have a height of 1.20-1.80 mm, a spacing of 2.3-3.3 mm, an angle of 30-45° and a tip deviation of 0 mm; and the elastomer flow channel has a depth of 0.65-0.95 mm and a total length of 13.5-16.5 mm.

8. The irrigation method according to claim 6, wherein in the variable-flow-rate anti-clogging emitter, the water outlet has a radius of 2-3 mm; and the water inlet has a length of 1-2 mm and a width of 0.5-1 mm.

9. The irrigation method according to claim 6, wherein in the variable-flow-rate anti-clogging emitter, the multiple parallel feeding channels are each provided therein with a first inclined surface, and the lower surface of the lower casing is provided with the second inclined surface having a same inclination direction as the first inclined surface.

10. The irrigation method according to claim 6, wherein in the variable-flow-rate anti-clogging emitter, the discharging portion is provided with the circular slot, which is connected with the slot.

\* \* \* \* \*